United States Patent [19]
Murata

[11] Patent Number: 5,128,991
[45] Date of Patent: Jul. 7, 1992

[54] DIALING CONFIRMATION TONE OUTPUT APPARATUS

[75] Inventor: Yukio Murata, Tokyo, Japan
[73] Assignee: NEC Corporation, Tokyo, Japan
[21] Appl. No.: 415,673
[22] Filed: Oct. 2, 1989

[30] Foreign Application Priority Data

Sep. 30, 1988 [JP] Japan ................... 63-246518

[51] Int. Cl.⁵ .......................................... H04M 1/26
[52] U.S. Cl. ................... 379/361; 379/373; 379/418; 379/387
[58] Field of Search ............... 379/373, 374, 375, 418, 379/387, 391, 392, 360, 361, 381, 72, 430

[56] References Cited

U.S. PATENT DOCUMENTS

| | | | |
|---|---|---|---|
| 4,406,926 | 9/1983 | Duncan | 379/361 |
| 4,442,322 | 4/1984 | Grantland | 379/361 |
| 4,496,799 | 1/1985 | Kingen et al. | 379/361 X |
| 4,508,938 | 4/1985 | Berch et al. | 379/361 |

FOREIGN PATENT DOCUMENTS

| | | | |
|---|---|---|---|
| 0204375 | 11/1983 | Fed. Rep. of Germany | 379/361 |
| 0181254 | 11/1982 | Japan | 379/361 |
| 0086945 | 4/1988 | Japan | 379/361 |

Primary Examiner—James L. Dwyer
Assistant Examiner—M. Shehata
Attorney, Agent, or Firm—Sughrue, Mion, Zinn, Macpeak & Seas

[57] ABSTRACT

A dialing confirmation tone (DCT) output apparatus including a variable attenuator connected between a DCT generator and an adder adding a received voice signal and a dialing confirmation tone. The attenuator attenuates the confirmation tone based on a control signal from a control circuit. The control circuit produces the control signal using a conversation condition signal and a receiving situation signal. The conversation condition signal is provided from a conversation condition detector and indicates whether conversation is taking place or not. The receiving situation signal is provided from an earphone jack circuit and indicates whether or not an earphone is used for outputting the added signal. The attenuated confirmation tone can be heard while conversation takes place or the earphone is used.

22 Claims, 2 Drawing Sheets

FIG.4A a  REC 15
           EP 17

FIG.4B b  TALK
          NOT

FIG.4C c

FIG.4D d  NOT
          ATT

DIALING CONFIRMATION TONE OUTPUT APPARATUS

BACKGROUND OF THE INVENTION

The present invention relates to a dialing confirmation tone (DCT) output apparatus and, more particularly, to a DCT output apparatus to be connected to a receiver of a telephone and to an earphone, or a headset.

When one of its push-button keys is pressed, a push-button dial telephone set generates a DCT, or signaling tone, to inform the user that a dual tone multi-frequency (DTMF) signal corresponding to the pressed key is generated and transmitted to an exchange office. Usually, such a DCT is generated when the user dials the number of the called party. But, even after a voice channel is established, i.e., during conversation, a DCT is generated if the user dials the number representative of a control signal which remotely controls home appliances, inquires an automatic answering telephone set, gains access to computers, and so forth. If a DCT is generated during conversation, it may be added to a received voice signal.

In a conventional DCT output apparatus, a transducer which is dedicated to producing a dialing confirmation tone is installed in an earpiece of a telephone. This makes the earpiece bulky and reduces the clarity of the tone. To avoid these problems, a receiver of a telephone which outputs a received voice signal could be used for emitting the confirmation tone. Using the receiver, however, makes the user uncomfortable when the confirmation tone is produced during conversation, because the user has to keep the receiver close to his ear to listen to the conversation. Similarly, if an earphone is employed to hear the conversation instead of the receiver, a loud confirmation tone reaches the user's ear, making him uncomfortable.

SUMMARY OF THE INVENTION

An object of the present invention is, therefore, to provide a generally improved dialing confirmation tone (DCT) output apparatus which eliminates the above-mentioned problems.

Another object of the present invention is to provide a DCT output apparatus to be connected to a receiver of a telephone and to an earphone.

Yet another object of the present invention is to provide a DCT output apparatus capable of controlling the volume of a dialing confirmation tone.

Still yet another object of the present invention is to provide a DCT output apparatus having a volume control circuit which controls the volume of a DCT based on the receiving situations of a voice signal and on the condition of conversation.

According to the present invention, there is provided a dialing confirmation tone (DCT) output apparatus including a variable attenuator connected between a DCT generator and an adder adding a received voice signal and a dialing confirmation tone. The attenuator attenuates the confirmation tone based on a control signal from a control circuit. The control circuit produces the control signal using a conversation condition signal and a receiving situation signal. The conversation condition signal is provided from a conversation condition director and indicates whether conversation is taking place or not. The receiving situation signal is provided from an earphone jack circuit and indicates whether or not an earphone is used for outputting the added signal. The attenuated confirmation tone can be heard while conversation takes place or the earphone is used.

BRIEF DESCRIPTION OF THE DRAWINGS

The above and other objects, features and advantages of the present invention will become more apparent from the following description referring to the accompanying drawings, in which:

FIGS. 4A–4D are time charts for explaining the operation of DCT output apparatus shown in FIGS. 1–3.

DETAILED DESCRIPTION OF THE PREFERRED EMBODIMENTS

Figure 1:
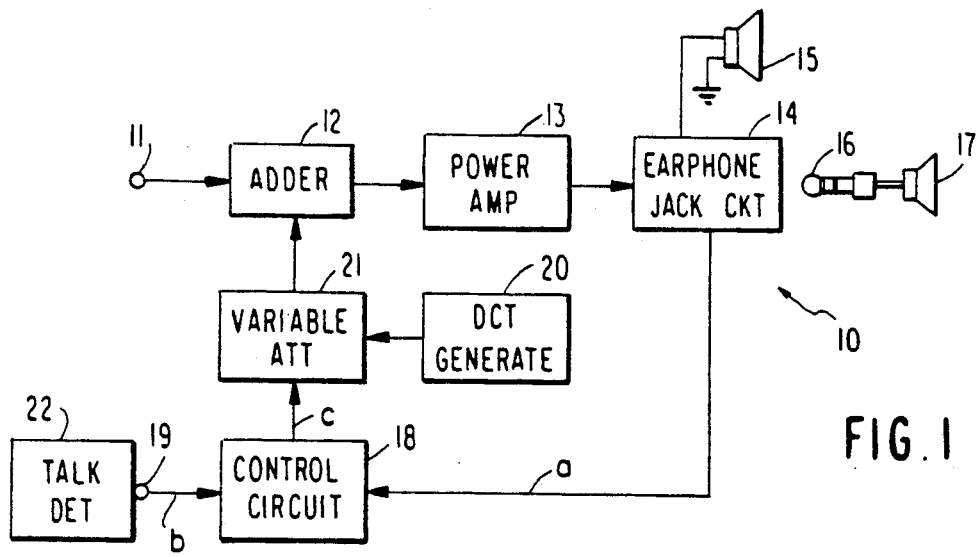
FIG. 1 is a schematic block diagram showing a DCT output apparatus according to an embodiment of the present invention.

In FIG. 1, a dialing confirmation tone (DCT) output apparatus 10 includes an adder 12 to which a received voice signal is supplied through a voice input terminal 11. The adder 12 also receives a DCT signal provided from a DCT generator 20 through a variable attenuator 21. The adder 12 adds the received two signals to produce an added signal. The added signal is amplified by a power amplifier 13 whose output is delivered from either a receiver 15 of a telephone or an earphone 17 through an earphone jack circuit 14. The receiver 15 and earphone 17 are well known as alternating current-acoustic wave transducers and the output of receiver 15 is louder than that of earphone 17.

When a plug of earphone 17 is inserted into the jack circuit 14, the jack circuit 14 provides the output of power amplifier 13 to the earphone 17. When the plug is not inserted, on the other hand, the jack circuit 14 provides the power amplifier 13 output to the receiver 15. Thus, the jack circuit 14 works as a switch circuit for switching between the receiver 15 and the earphone 17.

The earphone jack circuit 14 has another function, to produce a receiving situation signal a indicating whether or not the earphone 17 is used for outputting the voice signal. The receiving situation signal a is supplied to a control circuit 18. The control circuit 18 also receives a conversation condition signal b which is provided from a conversation detection circuit 22 and indicates whether or not conversation is held by a telephone. The detection circuit 22 may detect such a condition using the status of a hook switch. Using the receiving situation signal a and the conversation condition signal b, the control circuit 18 produces a control signal c to control the attenuation of the variable attenuator 21, i.e., the volume of the DCT signal.

More specifically, four situations will be discussed. In the first situation where no conversation is taking place and the receiver 15 is used for outputting a voice signal, the control circuit 18 causes the variable attenuator 21 not to attenuate the DCT signal. Thus, the confirmation tone is delivered from the receiver 15 so loudly that the user can hear the tone even if he keeps the receiver 15 away from his ear. In the remaining three situations, the control circuit 18 causes the attenuator 21 to attenuate the DCT signal. These three situations include a situation where conversation is taking place and the receiver 15 is used, a situation where no conversation is taking place and the earphone 17 is used and a situation where conversation is taking place and the earphone 17 is used. Thus, in the remaining three situations the confirmation tone is delivered from either the receiver 15 or the earphone 17 so quietly that the user feels comfortable even if he keeps the receiver 15 close to his ear or he puts on the earphone 17.

Figure 2:
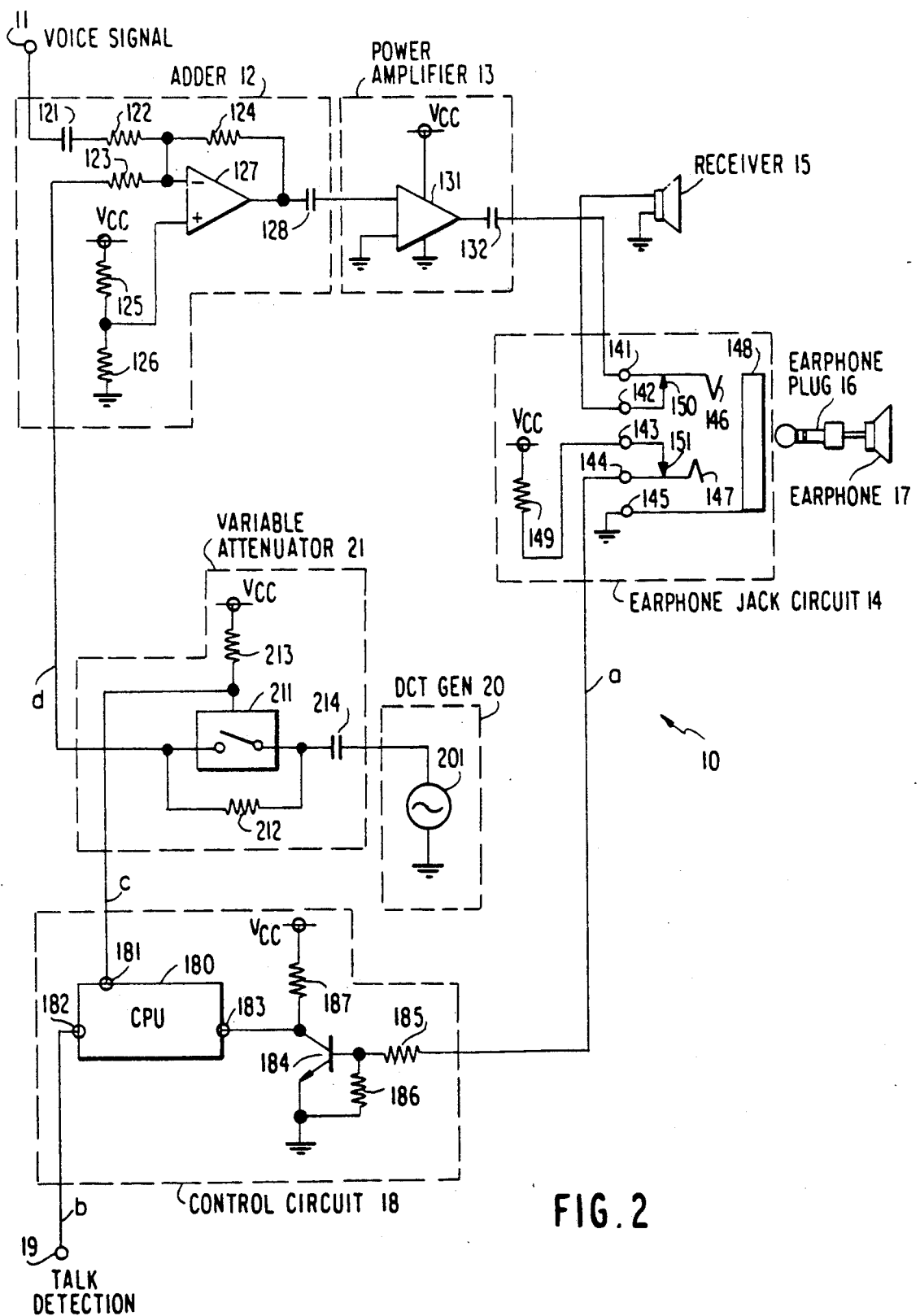
FIG. 2 is a specific circuit diagram of DCT output apparatus shown in FIG. 1.

In FIG. 2, the adder 12 includes an operational amplifier 127 whose inverted terminal is connected to one end of each of resistors 122 and 123. The other end of resistor 122 is connected to the voice input terminal 11 through a DC-blocking capacitor 121. The other end of resistor 123 is connected to the output of attenuator 21. The non-inverted terminal of amplifier 127 is connected to the junction of resistors 125 and 126, the other ends of which are connected to a voltage source Vcc and ground, respectively. A feedback resistor 124 is connected between the output and inverted terminal of amplifier 127. The output of amplifier 127 is coupled to the power amplifier 13 through a DC-blocking capacitor 128.

The power amplifier 13 includes an operational amplifier 131 whose output is connected to the jack circuit 14 through a DC-blocking capacitor 132. The amplifier 13 is powered by the voltage Vcc.

The earphone jack circuit 14 includes five terminals 141 to 145 which are connected to the output of power amplifier 13, the receiver 15, one end of a resistor 149, the control circuit 18 and ground, respectively. The other end of resistor 149 is connected to the voltage source Vcc. Jack contacts 146 and 147 are connected to the terminal 141 and 144, respectively. Contacts 150 and 151 are connected to the terminals 142 and 143, respectively. A jack socket 148 is grounded through the terminal 145 and accepts an earphone plug 17.

The control circuit 18 includes a central processing unit (CPU) 180 and an NPN transistor 184 whose emitter and collector are grounded and connected to a terminal 183 of CPU 180, respectively. A resistor 185 is connected between the base of transistor 184 and the output of earphone jack circuit 14. A resistor 186 is connected between the base and emitter of transistor 104. A resistor 187 is connected between the collector of transistor 184 and the voltage source Vcc. Terminals 181 and 182 of CPU 180 are connected to the attenuator 21 and the terminal 19 of conversation detection circuit 22, respectively.

The DCT generator 20 includes a tone generator 201 connected between the attenuator 21 and ground. The attenuator 21 includes an analog switch 211 connected between its output and input. A resistor 212 is connected in parallel with the switch 211. A DC-blocking capacitor 214 is inserted between the switch 211 and the DCT generator 20. A resistor 213 is connected between the voltage source Vcc and a control terminal (not shown) of analog switch 211. The control terminal of switch 211 is also connected to the terminal 181 of CPU 180.

In operation, the amplifier 127 adds a voice signal and DCT signal provided thereto through the resistors 122 and 123, respectively. The added signal is applied to one input of amplifier 131 after its DC component is eliminated by the capacitor 128. The amplifier 131 amplifies the added signal and provides the amplified signal to the earphone jack circuit 14 through the DC-blocking capacitor 132.

When the earphone plug 16 is not inserted into the jack circuit 14 as shown in FIG. 1, the contacts 150 and 151 are in contact with the jack contacts 146 and 147, respectively, so that the output of power amplifier 13 is fed to the receiver 15 and a high-level signal is provided to the control circuit 18 as a receiving situation signal a (see FIG. 4A). In this case, the high-level situation signal a indicates that the receiver 15 delivers the output of power amplifier 13.

Figure 3:
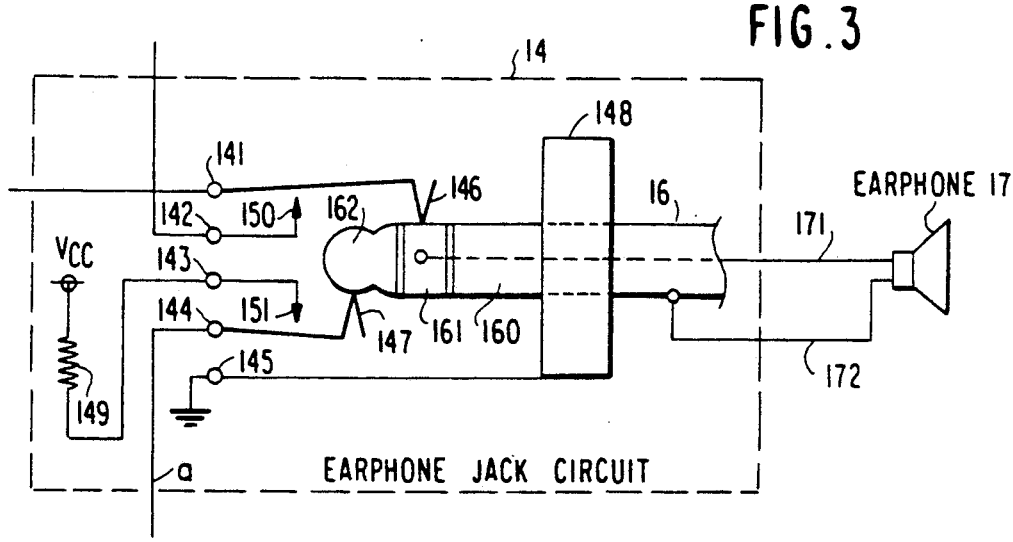
FIG. 3 is a schematic circuit diagram showing the earphone jack circuit of DCT output apparatus shown in FIGS. 1 and 2.

When the plug 16 is plugged into the jack circuit 14 as shown in FIG. 3, the positive terminal 161 of plug 16 is brought into contact with the jack contact 146 and thus one wire 171 of earphone 17 is electrically connected to the output of power amplifier 13. At the same time, another wire 172 of earphone 17 is grounded through the negative terminal 160 of plug 16, the plug socket 148 and the terminal 145. Thus, the output of power amplifier 13 is outputted from the earphone 17. Moreover, the head 162 of plug 16 breakes contact between the terminals 143 and 144, so that a low-level signal is provided to the central circuit 18 as the receiving situation signal a (see FIG. 4A). In this case the low-level situation signal a indicates that the earphone 17 is used for outputting the output of power amplifier 13.

When the receiving situation signal a is high, the transistor 184 turns on to cause the terminal 183 to be grounded. Otherwise, the transistor 184 turns off to cause the terminal 183 to be a high-level. Thus, the signal a is inverted by the transistor 184. If conversation is held, the conversation detection circuit 20 provides a high-level condition signal b at the terminal 19 (see FIG. 4B). Otherwise, the detection circuit 20 provides a low-level condition signal b (also see FIG. 4B). The signal b is provided at the terminal 182 of CPU 180.

Using the inverted situation signal a and the conversation condition signal b, CPU 180 produces a control signal c shown in FIG. 4C. In particular, when the signal a is high and the signal b is low, that is, the receiver 15 is used and no conversation is taking place, CPU 180 outputs a high-level signal as the control signal c. Otherwise, CPU 180 produces a low-level signal as the control signal c.

When the control signal c is high, the analog switch 211 is closed, so that no attenuation is added to the DCT signal. On the other hand, when the control signal c is low, the switch is open, so that the DCT signal passes the resistor 212 to be attenuated (see FIG. 4D). The attenuation value is given as follows.

$$\frac{R_{123}}{R_{123} + R_{212}}$$

where $R_{123}$ and $R_{212}$ are the resistances of resistors 123 and 212, respectively. By changing the resistances $R_{123}$ and $R_{212}$, therefore, the attenuation value can be changed. Thus, only when no conversation is taking place and the receiver 15 is connected to the output of power amplifier 13, no attenuation is added to the DCT signal. In all the other situations, the DCT signal is attenuated. Accordingly, uncomfortable DCT sound cannot be heard from the receiver 15 or earphone 17.

What is claimed is:

1. A dialing confirmation tone (DCT) output apparatus comprising:

adder means for adding a voice signal and a DCT signal to produce an added signal;

earphone jack means for applying said added signal to either a receiver or an earphone and for producing a first situation signal when said added signal is applied to said receiver and a second situation signal when said added signal is applied to said earphone;

means for detecting the condition of conversation to produce a first condition signal when no conversation is taking place and a second condition signal when conversation is taking place; and first means for attenuating said DCT signal in response to either said second situation signal or said second condition signal.

2. An apparatus as claimed in cliam 1, wherein said first means comprises:

control means for producing a first control signal in response to said first situation signal and to said first condition signal and for producing a second control signal in response to either said second situation signal or said second condition signal; and attenuator means for attenuating said DCT signal in response to said second control signal and for providing a nonattenuated DCT signal to said adder means in response to said first control signal.

3. An apparatus as claimed in claim 2, wherein said attenuator means comprises parallel connected analog switch and resistor.

4. An apparatus as claimed in claim 1, wherein said earphone jack means comprises:

socket means for accepting and supporting an earphone plug connected to said earphone; and first and second jack contacts coupled to the output of said adder means and said first means, respectively, said first and second jack contacts being in contact with said receiver and a voltage source, respectively, when said earphone plug is not plugged into said socket means and being in contact with said earphone and out of contact with said voltage source, respectively, when said earphone plug is plugged in said socket means.

5. An apparatus as claimed in claim 1, further comprising means connected between the output of said adder means and the input of said earphone jack means for amplifying said added signal.

6. An apparatus comprising:

means for generating a dialing confirmation signal;

means responsive to a control signal for attenuating said dialing confirmation signal;

means for adding an input signal and the output of said attenuating means;

switching means for providing the output of said adding means to a receiver when an earphone is not used, for providing the output of said adding means to said earphone when said earphone is used and for producing a situation signal when said earphone is not used;

means for producing a condition signal when conversation is taking place; and control means for producing said control signal in response to said situation signal and to said condition signal.

7. An apparatus as claimed in claim 6, wherein said control means comprises:

transistor means for inverting said situation signal to produce an inverted situation signal; and CPU means for producing said control signal in response to said inverted situation signal and to said condition signal.

8. An apparatus as claimed in claim 6, wherein said attenuating means comprises:

switch means for passing said dialing confirmation signal in response to the absence of said control signal, said switch means being open in response to said control signal; and resistor means connected in parallel with said switch means for attenuating said dialing confirmation signal.

9. An apparatus as claimed in claim 8, wherein said switch means comprises an analog switch.

10. An apparatus as claimed in claim 6, wherein said adding means comprises: an operational amplifier; a first capacitor receiving said input signal; a first resistor, one end of which is connected to said first capacitor; a second resistor, one end of which is connected to the output of said attenuating means, the other ends of said first and second resistors being connected to each other and being connected to an inverted input of said amplifier; a third resistor connected between said inverted input and the output of said amplifier; a fourth resistor, one end of which is connected to a voltage source; a fifth resistor, one end of which is grounded, the other ends of said fourth and fifth resistors being connected to a noninverted input of said amplifier; and a second capacitor connected between the outputs of said amplifier and said adding means.

11. An apparatus comprising:

means for selecting first and second current-acoustic transducers, the output of said first transducer being louder than that of said second transducer;

means for adding an input signal and a confirmation signal to provide an added signal to the selected one of said first and second transducers;

means for producing a conversation signal when conversation is taking place;

means for producing a non-conversation signal when no conversation is taking place;

means responsive to a control signal for attenuating said confirmation signal; and control means for producing said control signal in response to the selected condition of said first and second transducers and to one of said conversation and non-conversation signals.

12. An apparatus as claimed in claim 11, wherein said selecting means comprises: means for producing a first selection signal when said first transducer is selected; means for producing a second selection signal when said second transducer is selected, and wherein said control means comprises: means for producing an attenuation signal as said control signal in response to either said conversation signal or said second selection signal; and means for producing a non-attenuation signal as said control signal in response to said first selection signal and to said non-conversation signal, and wherein said attenuating means comprises: means for adding attenuation to said confirmation signal in response to said attenuation signal; and means for adding no attenuation to said confirmation signal in response to said non-attenuation signal.

13. An apparatus as claimed in claim 12, wherein said attenuating means comprises a resistor connected between the output and input of said attenuating means; and a switch connected parallel to said resistor, being closed in response to said non-attenuation signal and being open in response to said attenuation signal.

14. An apparatus as claimed in claim 13, wherein said switch comprises an analog switch.

15. An apparatus as claimed in claim 11, wherein said first transducer comprises a receiver of a telephone and wherein said second transducer comprises an earphone.

16. An apparatus as claimed in claim 15, wherein said selecting means comprises: an earphone plug connected to said earphone; and earphone jack accepting said plug and coupled to said receiver of a telephone, to said adding means and to said control means.

17. An apparatus as claimed in claim 11, wherein said adding means comprises: first and second resistors receiving at one ends thereof said input signal and said confirmation signal, respectively, the other ends of said first and second resistors being connected with each other; and amplifier means for amplifying a signal provided at said other ends of said first and second resistors.

18. A DCT output apparatus comprising:
    means for generating a dialing confirmation tone;
    means for adding a received voice signal and said tone;
    means connected to said generating means and to said adding means for attenuating said tone in response to a control signal;
    first detection means for generating a conversation condition signal indicating whether or not conversation is taking place;
    second detection means for generating a receiving situation signal indicating that a receiver of a telephone or an earphone is used for outputting the output of said adding means; and
    control means for producing said control signal in response to the combination of said conversation condition and receiving situation signals.

19. An apparatus as claimed in claim 18, wherein said second detection means comprises: means for accepting a plug of said earphone; means responsive to no acceptance, by said accepting means, of said plug for connecting the output of said adding means to said receiver and producing a first signal as said receiving situation signal; means responsive to the acceptance, by said accepting means, of said plug for connecting the output of said adding means to said earphone and producing a second signal as said receiving situation signal.

20. An apparatus as claimed in claim 18, wherein said attenuating means comprises: a resistor connected to the input and output of said attenuating means; and a switch connected in parallel to said resistor and being closed or open in response to said control signal.

21. A method of controlling a volume of a dialing confirmation signal to be outputted from either a receiver of a telephone or an earphone, comprising the following steps of:
    selecting one of a receiver of a telephone and an earphone;
    adding an input signal and a dialing confirmation signal to provide an added signal to the selected one of said receiver and earphone;
    producing a conversation signal when coversation is taking place;
    producing a non-conversation signal when no conversation is taking place;
    responsive to a control signal, attenuating said dialing confirmation signal; and
    responsive to the selected condition of said receiver and earphone and to one of said conversation and non-conversation signals, producing said control signal.

22. A method as claimed in claim 21,
    wherein said selecting step comprises the steps of:
    producing a first selection signal when said receiver is selected;
    producing a second selection signal when said earphone is selected;
    and where said step of producing said control signal comprises the steps of:
    responsive to either said conversation signal or said second selection signal, producing an attenuation signal as said control signal; and
    responsive to said first selection signal and to said non-conversation signal, producing a non-attenuation signal as said control signal,
    and wherein said attenuating step comprises the steps of:
    responsive to said attenuation signal, adding attenuation to said dialing confirmation signal; and
    responsive to said non-attenuation signal, adding no attenuation to said dialing confirmation signal.

* * * * *